United States Patent
Worman

(10) Patent No.: US 12,010,189 B2
(45) Date of Patent: Jun. 11, 2024

(54) ROADSIDE EDGE NODE CENTRAL MANAGEMENT

(71) Applicant: The Regents of the University of Michigan, Ann Arbor, MI (US)

(72) Inventor: Tyler S. Worman, Ypsilanti, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 17/889,484

(22) Filed: Aug. 17, 2022

(65) Prior Publication Data
US 2023/0056744 A1     Feb. 23, 2023

Related U.S. Application Data

(60) Provisional application No. 63/233,948, filed on Aug. 17, 2021.

(51) Int. Cl.
| | | |
|---|---|---|
| H04L 12/24 | (2006.01) | |
| H04L 41/0803 | (2022.01) | |
| H04L 67/12 | (2022.01) | |
| H04L 67/53 | (2022.01) | |

(52) U.S. Cl.
CPC .............. H04L 67/53 (2022.05); H04L 67/12 (2013.01)

(58) Field of Classification Search
CPC ................................. H04L 67/53; H04L 67/12
USPC ......................................................... 709/219
See application file for complete search history.

(56) References Cited

U.S. PATENT DOCUMENTS

| | | | | |
|---|---|---|---|---|
| 6,353,792 B1* | 3/2002 | Murthy | ..................... | G08G 1/01 |
| | | | | 701/532 |
| 6,401,081 B1* | 6/2002 | Montgomery | ............ | H04L 9/40 |
| | | | | 705/63 |
| 6,470,377 B1* | 10/2002 | Sevcik | ..................... | H04L 67/06 |
| | | | | 700/181 |
| 10,324,701 B1* | 6/2019 | Stickle | ...................... | G06F 8/63 |
| 2015/0347096 A1* | 12/2015 | Hanna | ....................... | G06F 8/36 |
| | | | | 717/107 |
| 2016/0076207 A1* | 3/2016 | Moran | ............. | G08G 1/096716 |
| | | | | 340/905 |
| 2016/0247238 A1* | 8/2016 | Kunapuli | ............... | G06Q 40/12 |
| 2017/0026893 A1* | 1/2017 | Lagassey | .................. | G01S 3/80 |
| 2017/0060574 A1* | 3/2017 | Malladi | ................... | H04W 4/38 |
| 2018/0357097 A1* | 12/2018 | Poort | .................... | G06F 9/4881 |
| 2019/0103030 A1* | 4/2019 | Banga | ................... | G01S 5/0027 |
| 2019/0337512 A1* | 11/2019 | Tahmasbi-Sarvestani | .................... | |
| | | | | B60W 30/0956 |
| 2021/0289001 A1* | 9/2021 | Wilson | .................. | H04L 63/101 |
| 2021/0409917 A1* | 12/2021 | Wang | ................. | G08G 1/09675 |

(Continued)

Primary Examiner — Moustafa M Meky
Assistant Examiner — Elizabeth Kassa
(74) Attorney, Agent, or Firm — Reising Ethington P.C.

(57) ABSTRACT

A system and method for managing third-party software packages at a roadside edge node. The method includes: receiving a third-party software package at an edge node management controller that is located at a roadside edge node, wherein the edge node management controller is used to execute a software manager application; using the software manager application, installing the third-party software package at the roadside edge node; executing the third-party software package at the roadside edge node; and providing sensor information to the third-party software package indicating information concerning one or more sensors that are present at the roadside edge node.

18 Claims, 3 Drawing Sheets

(56) References Cited

U.S. PATENT DOCUMENTS

2022/0340162 A1\* 10/2022 Qi ........................ G06V 20/56
2023/0074288 A1\* 3/2023 Filippou ........... H04W 28/0236

\* cited by examiner

ROADSIDE EDGE NODE CENTRAL MANAGEMENT

TECHNICAL FIELD

This disclosure relates to methods and systems for managing software at a roadside edge node.

BACKGROUND

Municipalities are typically in control or at least regulate the type of equipment that is present along roads, and may allow one or more companies, individuals, or other entity (referred to as "third parties") to install sensors, controllers, or other equipment along a road as well as to execute software for purposes of collecting and storing sensor data—these third party systems are referred to as "third-party edge systems." This allows third parties to capture various sensor data concerning the road and, in some scenarios, to carry out experiments or testing.

SUMMARY

In accordance with an aspect of the disclosure, there is provided a method for managing third-party software packages at a roadside edge node. The method includes: receiving a third-party software package at an edge node management controller that is located at a roadside edge node, wherein the edge node management controller is used to execute a software manager application; using the software manager application, installing the third-party software package at the roadside edge node; executing the third-party software package at the roadside edge node; and providing sensor information to the third-party software package indicating information concerning one or more sensors that are present at the roadside edge node.

According to various embodiments, this method may further include any one of the following features or any technically-feasible combination of some or all of these features:
- the third-party software package is installed on the edge node management controller and executed on the edge node management controller;
- an application programming interface (API) is used by the third-party software package to communicate with the software manager application;
- the sensor information is provided to the third-party software package in response to a request from the third-party software package, and wherein the request and response are configured according to the API;
- the software manager application is configured to receive sensor data requests from the third-party software package, and wherein the sensor data requests are formed according to the API;
- the software manager application is configured to receive sensor data requests from one or more other third-party software packages in addition to the third-party software package, and wherein each of the sensor data requests from the one or more other third-party software packages is formed according to the API;
- the third-party software package is received from a third-party remote computer that is located remotely from the roadside edge node;
- the third-party software package is containerized according to specifications set forth by an application programming interface (API);
- the software manager application is configured in a manner that enables any third-party sensor package that is containerized according to the API to be installed at the roadside edge node; and/or
- the executing step further comprises the third-party software package controlling the one or more sensors.

In accordance with another aspect of the disclosure, there is provided a roadside central management system that includes: a controller having a processor and a non-transitory, computer-readable memory storing computer instructions constituting a software manager application; and a network communications interface that includes hardware enabling data communications and that is communicatively coupled to the controller. The computer instructions, when executed by the processor, cause the roadside central management system to: receive a third-party software package at an edge node management controller that is located at a roadside edge node, wherein the edge node management controller is used to execute the software manager application; using the software manager application, install the third-party software package at the roadside edge node; execute the third-party software package at the roadside edge node; and provide sensor information to the third-party software package indicating information concerning one or more sensors that are present at the roadside edge node.

According to various embodiments, this roadside central management system may further include any one of the following features or any technically-feasible combination of some or all of these features:
- the roadside central management system is installed at the roadside edge node;
- the one or more sensors are connected to the controller, and wherein the controller is configured to implement an application programming interface (API) that is used by the third-party software package to communicate with the software manager application;
- the sensor information is provided to the third-party software package in response to a request from the third-party software package, and wherein the request and response are configured according to the API;
- the software manager application is configured to receive sensor data requests from the third-party software package, wherein the sensor data requests are formed according to the API; and/or
- the software manager application is configured to receive sensor data requests from one or more other third-party software packages in addition to the third-party software package, wherein each of the sensor data requests of the one or more other third-party software packages is formed according to the API.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The system and method described herein enables centralized management of software applications that are configured to be executed at a roadside edge node, which is a collection of roadside equipment that is present along or proximate a road. As mentioned above, municipalities are typically in control or at least regulate the type of equipment that is present at roadside edge node. However, since each third-party edge system is designed or configured solely for its own purposes, specific sensors, controllers, and other hardware may need to be installed at the roadside edge node for each third party edge system. This may result in redundant sensors being installed at the roadside edge node; for example, a first third-party edge system may install a first camera at the intersection and configure the camera so it is directed at a first region and a second third-party edge system may also install a second camera at the intersection and also configure the second camera so it is directed at a first region.

As a part of some roadside edge nodes, at least in some scenarios, the process of deploying and updating third-party edge systems, whether it is merely installing software or installing equipment (e.g., sensors, controllers), is carried out by the controlling municipality and may be a burdensome and arduous process as each third-party edge system is unique. Moreover, many third-party edge systems obtain large amounts of data, such as sensor data, and it is expensive to send this data to a remote system, such as a server operated by a third party. At least according to one or more embodiments, the roadside edge node central management system (or roadside central management system) overcomes the above-discussed deficiencies of typical roadside edge nodes by providing a centralized software management layer that enables centralized management of third-party software and a standardized sensor hub that enables third-party software from one or more third parties to access sensor data from, and/or control one or more aspects of, one or more sensors located at the roadside edge node.

Figure 1:
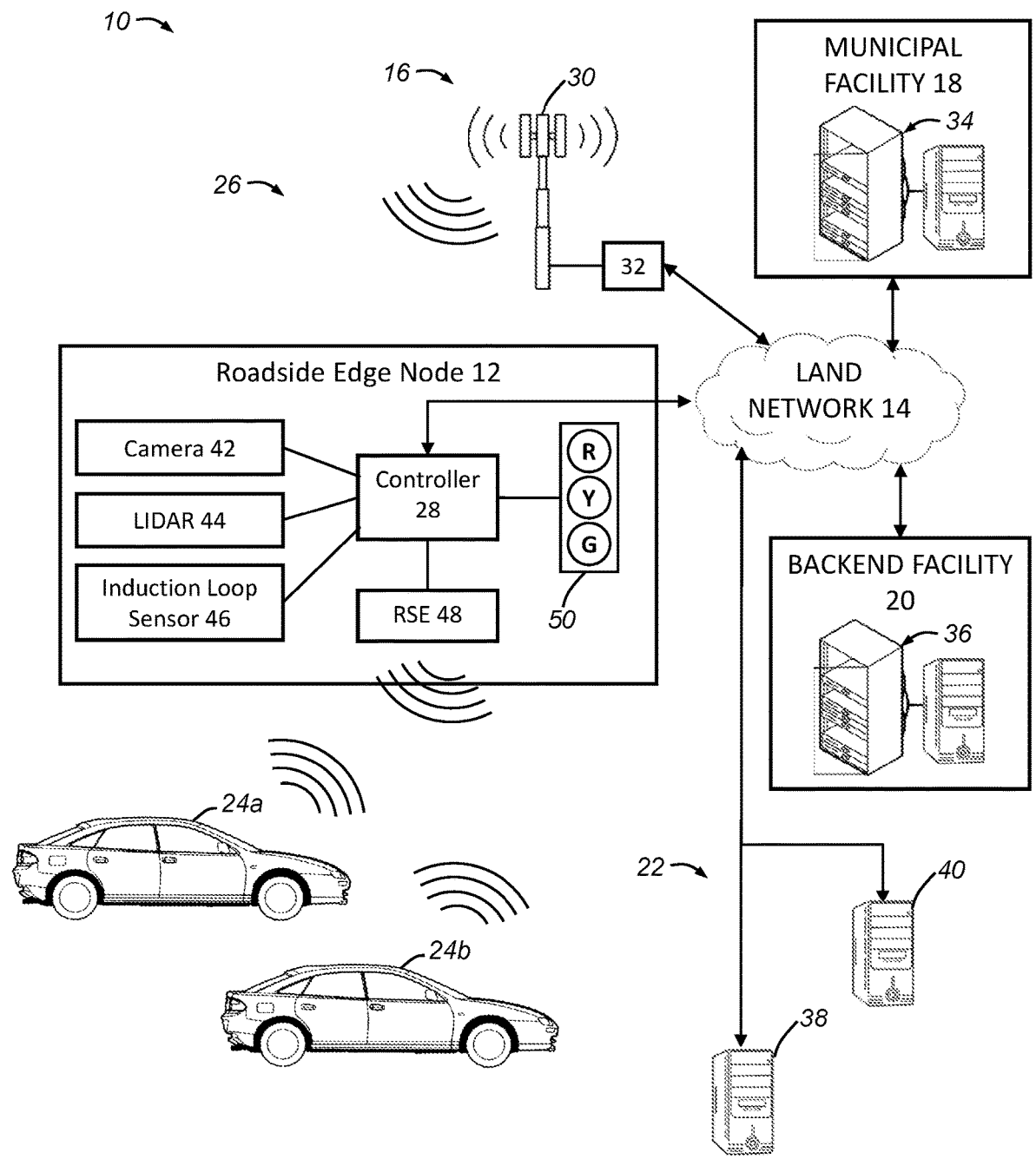
FIG. 1 depicts a communications system that includes a roadside central management system that is used to manage one or more software packages at a roadside edge node, according to one embodiment.

With reference now to FIG. 1, there is shown an operating environment that comprises a communications system 10 that includes a roadside edge node 12, a land network 14, a wireless carrier system 16, a municipal remote computer facility 18, a central management remote facility 20, one or more third-party remote computers 22, and one or more vehicles (two vehicles 24a-b are shown in the illustrated embodiment of FIG. 1). The communications system 10 also includes a roadside central management system 26, which includes an edge node management controller 28. However, in other embodiments, the roadside central management system 26 may include one or more other components of the communications system 10 in addition to the edge node management controller 28. Also, it should be appreciated that while the illustrated embodiment of FIG. 1 provides an example of one such communications system 10 in which the roadside central management system 26 may be used, the roadside central management system 26 may be used as part of various other communications system. Additionally, although the discussion below describes the components and operation of a single roadside edge node, the roadside central management system 26, or multiple instances thereof, may be used for multiple roadside edge nodes, at least according to one embodiment.

The land network 14 may be a conventional land-based telecommunications network that is connected to one or more landline telephones and connects the wireless carrier system 16 to the one or more remote facilities 18-20 and/or the third-party remote computer(s) 22. For example, the land network 14 may include a public switched telephone network (PSTN) such as that used to provide hardwired telephony, packet-switched data communications, and the Internet infrastructure. One or more segments of the land network 14 could be implemented through the use of a standard wired network, a fiber or other optical network, a cable network, power lines, other wireless networks such as wireless local area networks (WLANs), or networks providing broadband wireless access (BWA), or any combination thereof.

The wireless carrier system 16 may be any suitable cellular telephone system. The wireless carrier system 16 is shown as including a cellular tower 30; however, the wireless carrier system 16 may include additional cellular towers as well as one or more of the following components (e.g., depending on the cellular technology): base transceiver stations, mobile switching centers, base station controllers, evolved nodes (e.g., eNodeBs), mobility management entities (MMEs), serving and PGN gateways, etc., as well as any other networking components required to connect the wireless carrier system 16 with the land network 14 or to connect the wireless carrier system 16 with user equipment (UEs, e.g., which may include telematics equipment in vehicles 24a-b), all of which is indicated generally at 32. The wireless carrier system 16 can implement any suitable communications technology, including for example GSM/GPRS technology, CDMA or CDMA2000 technology, LTE technology, etc. In general, the wireless carrier system 16, its components, the arrangement of its components, the interaction between the components, etc. is generally known in the art.

The municipal remote computer facility 18 and the central management remote facility 20 are each a remote computer facility. As used herein, a "remote computer facility" is a facility that is located remotely from the roadside edge node 12 and that includes one or more computers. Each of the one or more computers discussed herein includes a processor and a non-transitory, computer-readable memory that is accessible by the processor. The processor may be any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. The memory is capable of storing data or information in electronic form so that the stored data or information is consumable by the processor. The memory may be any a variety of different electronic memory types and may be selected based on the application in which it is to be used. Examples of types of memory that may be used include magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It should be appreciated that the computers may include other memory, such as volatile RAM that is used by the processor, and/or multiple processors.

Each of the remote computer facilities 18-20 may be designed or configured to receive data from one or more other remote facilities and/or one or more components of the roadside central management system 26, such as the edge node management controller 28. Each of the remote computer facilities 18-20 may include various components and may include a wired or wireless local area network, as well as one or more servers, databases, and other hardware or equipment. Generally, each of the remote computer facilities 18-20 may receive and transmit data via a modem connected to the land network 14 and/or through use of cellular communications using the wireless carrier system 16. Although each of the remote facilities 18-20 are shown and described as being a single remote facility, it should be appreciated that multiple remote facilities may be used for carrying out the functionality described herein as being attributed to these remote facilities 18-20. Also, although the central management remote facility 20 and the municipal remote computer facility 18 are depicted in FIG. 1 as being separate facilities and discussed herein as being separate facilities, in other embodiments, one or more remote facilities may be used for carrying out the functionality attributed to both the central management remote facility 20 and the municipal remote computer facility 18. It should be appreciated that, at least in some embodiments, the municipal remote computer facility 18 and the central management remote facility 20 may be located remotely from the roadside edge node 12.

The municipal remote computer facility 18 includes one or more backend municipal edge node systems 34, which may be used to support various components or systems of one or more roadside edge nodes, including the roadside edge node 12. For example, one of the backend municipal edge node systems 34 may be a traffic signaling control system that may be used for controlling traffic signaling devices, such as the traffic signal 50. As another example, one of the backend municipal edge node systems 34 may be used to deploy one or more software applications to the roadside edge node 12. The one or more backend municipal edge node systems 34 may be implemented or carried out using one or more computers located at the municipal remote computer facility 18.

The central management remote facility 20 includes a backend central management system 36, which is used to support operations that are carried out by the roadside central management system 26, including those carried out by the edge node management controller 28. The backend central management system 36 may be used to assist or support a central edge node management application programming interface (API), referred to herein also as a "central management API." The central management API defines a standardized manner in which requests to access data, and/or requests to control one or more aspects, of the roadside edge node 12 may be made, as is discussed in more detail below. The backend central management system 36 may assist with the management of one or more third-party software packages. A third-party software package is software that is developed by a third party and that is to be executed at one or more roadside edge nodes, such as the roadside edge node 12. In one embodiment, the backend central management system 36 is used as a part of assisting with the deployment of third-party software packages to the roadside edge node 12. For example, the backend central management system 36 may receive a third-party software package from one of the third-party remote computer(s) 22 and then send the third-party software package to one or more edge node management controllers, such as the edge node management controller 28, so that the third-party software package may be installed at one or more specified roadside edge node(s).

The third-party remote computer(s) 22 is each a computer used by a third party to access data from the roadside central management system 26 and/or to send instructions/requests (herein referred to as "requests") to the roadside central management system 26. For example, the third-party remote computer 22 may request certain data from the roadside central management system 26, such as sensor data obtained by the edge node management controller 28. Or, for example, the third-party remote computer 22 may send a third-party software package to the roadside central management system 26, which then causes the third-party software package to be sent to and installed at the roadside edge node 12. In the illustrated embodiment of FIG. 1, a first third-party remote computer 38 and a second third-party remote computer 40 are shown, where the first third-party remote computer 38 is owned and/or operated by a first third party and the second third-party remote computer 40 is owned and/or operated by a second third party. However, it should be appreciated that any number of third-party remote computers can be used and that a single third party may use multiple third-party remote computers. The first third-party remote computer 38 is located remotely from the second third-party remote computer 40, and each of the third-party remote computers 22 is located remotely from the roadside edge node 12, the municipal remote computer facility 18, and the central management remote facility 20.

The roadside edge node 12 is a collection of hardware or equipment that is located proximate a road, such as at an intersection or along the side of a highway. The roadside edge node 12 is illustrated in FIG. 1 as including the edge node management controller 28, a camera 42, a lidar sensor 44, an inductance loop detector 46, roadside equipment (RSE) 48, and a traffic signal 50. Although the roadside edge node 12 is shown as including components 42-50, according to various embodiments, other components may be used in addition to or in lieu of the components 42-50. For example, a traffic signal controller may be provided at the roadside edge node 12, and this traffic signal controller may be separate from the edge node management controller 28 and used to control the traffic signal 50 and/or provide status information regarding the traffic signal 50, such as the state of the traffic signal 50 (e.g., a green light "G" of the traffic signal is illuminated or an amber (or yellow) light "Y" of the traffic signal 50 is blinking).

Figure 2:
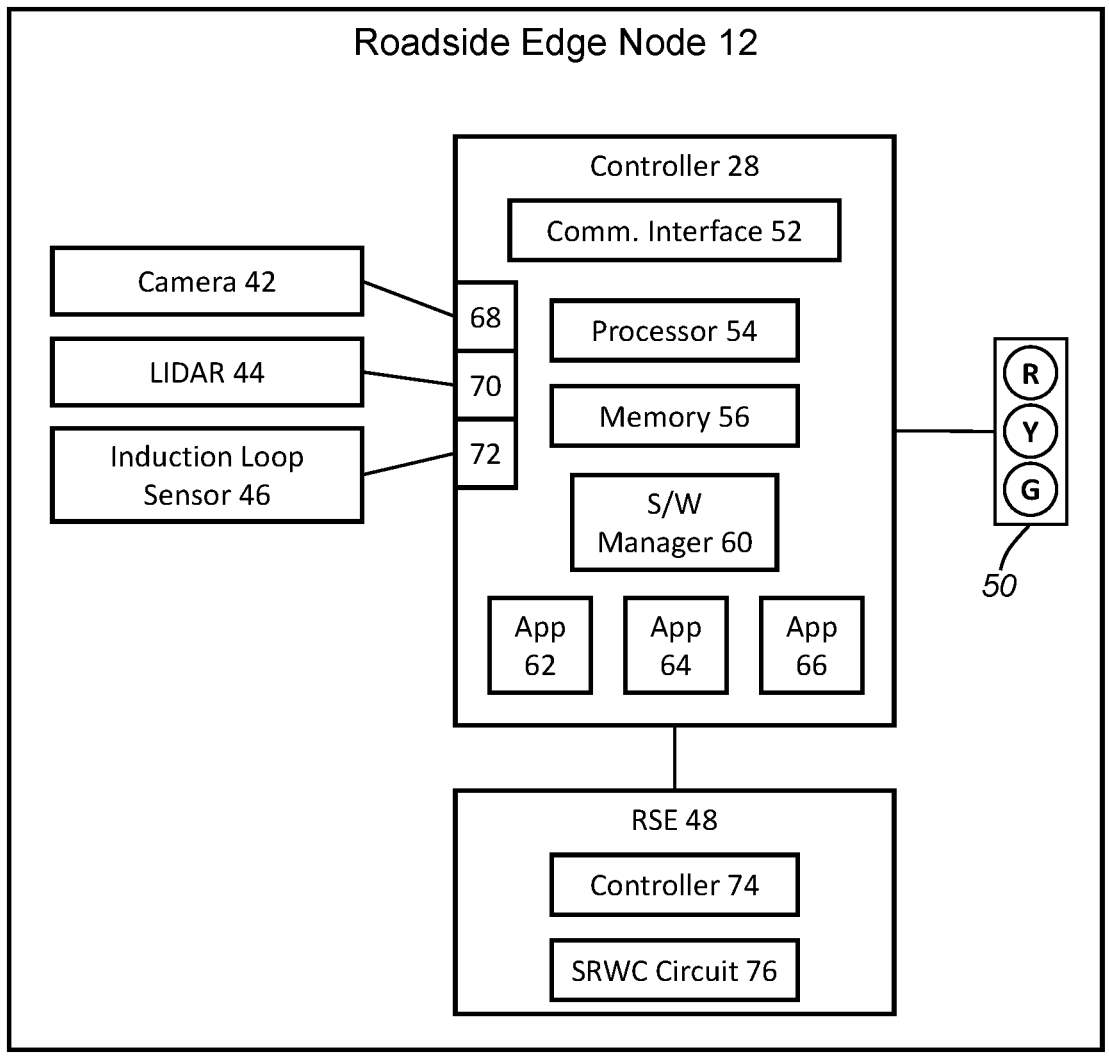
FIG. 2 depicts certain components of the roadside edge node and the roadside central management system of FIG. 1, according to one embodiment.

With reference to FIG. 2, there is shown a more detailed illustration of the roadside edge node 12. The edge node management controller 28 includes a network communications interface 52, a processor 54, memory 56, a software manager application 60 that is used to manage third-party software packages 62-66, and a plurality of sensor interfaces 68-72 that are used for communicating with the camera 42, the lidar sensor 44, and the inductance loop detector 46. The edge node management controller 28 may include one or more other components in addition to or in lieu of those components 52-72.

The network communications interface 52 is used to carry out network communications between the edge node management controller 28. The network communications interface 52 may be used to connect the edge node management controller 28 to one or more networks via the land network 14, the wireless carrier system 16, and/or other network connectivity mechanisms, such as through use of short-range wireless communication (SRWC) techniques (e.g., Wi-Fi™, Bluetooth™). In at least one embodiment, the network communications interface 52 is used to connect the edge node management controller 28 to the land network 14 and, in such embodiments, may be comprised of a modem.

Additionally or alternatively, in one embodiment, the network communications interface 52 includes a cellular chipset that is used to carry out data communications with one or more remote networks through use of the wireless carrier system 16. The network communications interface 52 may be used to carry out remote data communications via a remote data communication connection that is established between the edge node management controller 28 and one or more remote devices, computers, or systems that are located remotely from the roadside edge node 12, such as the municipal remote computer facility 18, the central management remote facility 20, and/or the third-party remote computer(s) 22.

In some embodiments, the network communications interface 52 may be used to carry out local data communications via a local data communication connection that is established between the edge node management controller 28 and one or more local devices, computers, or systems that are located remotely from the roadside edge node 12, such as the vehicles 24a-b, the RSE 48, one or more traffic signal controllers, and/or one or more sensors (e.g., the camera 42, the lidar sensor 44, and/or the inductance loop detector 46). One or more of these local data communication connections may be carried out using one or more SRWC technologies and, in such an embodiment, the network communications interface 52 may include one or more SRWC circuits that enable use of such SRWC technologies. Examples of SRWC technologies include any of the IEEE 802.11 protocols (e.g., IEEE 802.11p, Wi-Fi™), WiMAX™, ZigBee™, Z-Wave™, Wi-Fi Direct™, Bluetooth™ (e.g., Bluetooth™ Low Energy (BLE)), or near field communication (NFC).

The processor 54 may be any of those types of suitable processors discussed above, such as a CPU, a microcontroller or microprocessor, etc. The memory 56 may be any of those types of suitable memory devices discussed above and is used to store the software manager application 60 and the third-party software packages 62-66. The contents of the memory 56, which may include various data and/or one or more computer programs, are accessible by the processor 54. In the present embodiment, the software manager application 60 is stored on the memory 56 and the processor 54 is configured to execute the software manager application 60. The processor 54 is also used to execute the third-party software packages 62-66.

The edge node management controller 28 is used for managing one or more third-party software packages and, in the illustrated embodiment, the edge node management controller 28 is used for managing each of the third-party software packages 62-66. Management of these third-party software packages 62-66 is carried out by the software manager application 60. The software manager application 60 may be comprised of one or more computer programs that are stored on the memory 56 and executed by the processor 54 so as to carry out the functionality discussed herein that is attributed to the software manager application 60. The software manager application 60 is used to provide a standardized interface that the third-party software packages 62-66 may use to access data of the roadside edge node 12 and/or to configure or control one or more aspects of the roadside edge node 12, such as controlling a sampling rate or resolution of a sensor, executing a traffic signal sequence, etc.

In one embodiment, the software manger application 60 implements at least a portion of the central management API that is used by the third-party software packages 62-66 to access data of the roadside edge node 12 and/or to configure or control one or more aspects of the roadside edge node 12.

The central management API defines standards used for accessing data of the roadside edge node 12 and/or standards for configuring or controlling one or more aspects of the roadside edge node 12. The standards may include or indicate a particular format used for providing input and/or receiving output, and may include or specify network paths to be used in accessing or configuring various aspects of the roadside edge node 12.

The central management API may provide a standardized way for sensor data to be accessed by the third-party software packages 62-66. In one embodiment, the central management API, as implemented by the edge node management controller 28, is used to provide sensor data directly from one or more sensors to the third-party software packages 62-66. For example, a live stream of image data captured by the camera 42 may be provided or streamed from the camera 42 to the first third-party software package 62 via the central management API as implemented on the edge node management controller 28. In another embodiment, the central management API defines a manner in which sensor data that is stored in memory 56 may be provided to the third-party software packages 62-66 that requests such sensor data. For example, lidar sensor data may be continuously captured by the lidar sensor 44 and then stored in memory 56 and, then, in response to a request from a third-party software package that is received via the central management API as implemented on the edge node management controller 28, the stored lidar sensor data may be provided to the third-party software package.

In one embodiment, the central management API enables one or more sensors, such as the camera 42, the lidar sensor 44, and the inductance loop detector 46, to be discoverable by the third-party software packages. For example, a third-party software package may send a request configured in accordance with the central management API to the edge node management controller 28, where the request requests information regarding discoverable or available sensors that are at the roadside edge node 12. The software manager application 60 may respond to the request by providing sensor information, which may pertain to those sensors that the third-party software package is permitted to access. For example, the first third-party software package 62 may have permission to access the image data from the camera 42, but not permission to access data from the other sensors 44-46. And, in this example, the second third-party software package 64 may have permission to access sensor data from each of the sensors 42-46. These permissions may be enforced by the software manager application 60. In addition to providing a standardized mechanism for allowing third-party software packages to discover sensors located at the roadside edge node 12, the central management API may be used to allow the third-party software packages to discover other electronic devices located at the roadside edge node 12. Examples of various types of electronic devices that may be discoverable via the central management API include internet of things (IoT) devices, industrial internet of things (IIoT) devices, smart devices, and intelligent transportation system (ITS) infrastructure devices.

The central management API may provide a standardized way for one or more aspects of the sensors (or other electronic devices) to be controlled by the third-party software packages 62-66. For example, the first third-party software package may send a request or instruction to the software manager application 60 using the central management API. The request or instruction may be, for example, to set the sampling rate of the lidar sensor 44 or to set the resolution of the camera 42. Once the request is received at the software manager application 60, the software manager application 60 may determine whether to carry out or satisfy the request, which may be based on certain permissions granted to the third-party software package that sent the request and/or based on whether the roadside edge node 12 is in a suitable state for carrying out the request. For example, if the second third-party software package 64 had already requested to set the resolution of the camera 42 for a first time period, and then a request to set the resolution of the camera 42 to a different resolution by the first third-party software package 62 for a time period that overlaps the first time period may be denied by the software manager.

Also, in some embodiments, the central management API may provide a standardized way for one or more other aspects of the roadside edge node 12 to be configured or controlled by the third-party software packages 62-66. For example, the traffic signal status (e.g., a status indicating which of the lights "G", "Y", or "R" is illuminated) may be obtained by the third-party software packages 62-66 through sending a request to the software manager application 60 using or according to the central management API. As another example, information obtained by the RSE 48 (e.g., basic safety messages (BSMs) received at the RSE 48 from the vehicles 24*a-b*) may be requested by the third-party software packages 62-66 through sending a request to the software manager application 60 using the central management API.

In one embodiment, the central management API may also be used by one or more remote computers or systems to access data of the roadside edge node 12 and/or to configure or control one or more aspects of the roadside edge node 12. Also, in one embodiment, the central management API may be used to receive a third-party software package or a third-party software package update and install the third-party software package or third-party software package update on the edge node management controller 28, such as that which is discussed below in method 200.

In one embodiment, the edge node management controller 28 is used to manage permissions of the third-party software package(s) that are or are to be executed at the roadside edge node 12. For example, a third party may request to access certain data, such as sensor data, or to control one or more aspects of the roadside edge node 12, such as to set a sampling rate of a roadside sensor. The edge node management controller 28, such as through use of the software manager application 60, may keep track of permissions of the third-party software package(s) and enforce those permissions during operation or execution of the third-party software package(s). For example, when a third-party software package is executing and a request to access image data (a type of sensor data) of the camera 42 is received at the software manager application 60, the software manager application 60 determines whether the third-party software package is permitted to access the image data as requested; if so, the software manager application 60 fulfills the request and, if not, the software manager application 60 denies the request. In one embodiment, permissions data that specifies the permissions of one or more of the third-party software package(s) may be sent by the central management remote facility 20 and then received at the edge node management controller 28.

It should be appreciated that although the software manager application 60 is discussed herein as being a single application, the software manager application 60 may be comprised of one or more computer programs that may be executed at the same or different times and that are configured to carry out the functionality discussed herein that is attributed to the software manager application 60. Also, it should be appreciated that although the central management API is discussed herein as being a single API, the central management API may constitute one or more different APIs.

The roadside edge node 12 includes a plurality of roadside sensors, which, in the illustrated embodiment, include the camera 42, the lidar sensor 44, and the inductance loop detector 46. It should be appreciated that, in other embodiments, the roadside edge node 12 may include a different number of roadside sensors, such as one roadside sensor or a large number of roadside sensors. The data captured or obtained by a roadside sensor is referred to as sensor data. The sensor data may be continuously stored in memory, such as the memory 56, as it is (or soon after it is) captured or obtained by the roadside sensor.

The camera 42 is used to obtain image data of one or more objects within the environment, which can include color information of one or more objects. The camera 42 may be any suitable digital camera. The camera 42 is connected to the edge node management controller 28 via a first sensor interface 68, which may be selected according to the output of the camera 42. For example, where the camera 42 is an Internet Protocol (IP) camera, the first sensor interface 68 may be an ethernet port that is configured for receiving an ethernet cable that is connected to the camera 42. In another embodiment, the first sensor interface 68 may be a universal serial bus (USB) port. And, in one embodiment, the first sensor interface 68 may be a SRWC circuit that is used for carrying out Wi-Fi™ or BLE communications.

The lidar sensor 44 is used to obtain lidar sensor data of one or more objects within the environment, which can include range and position information of one or more objects. The lidar sensor 44 emits non-visible light waves that reflect off of object(s) and then receives the reflected waves. It should be appreciated that various types of lidar devices may be used, including, for example, those manufactured by Velodyne™, such as, for example, the Alpha Prime™, the Ultra Puck™, Puck™, etc. The lidar sensor 44 is connected to the edge node management controller 28 via a second sensor interface 70, which may be selected according to the output of the lidar sensor 44. For example, the second sensor interface 70 may be an Ethernet port.

The inductance loop detector 46 is an inductive-loop traffic detector or a vehicle detection loop that uses inductance to determine the presence of a vehicle on a particular portion of a road. The inductance loop detector 46 is connected to the edge node management controller 28 via a third sensor interface 72, which may be selected according to the output of the inductance loop detector 46.

The RSE 48 includes hardware that is used to communicate with one or more vehicles that are at or at least proximate to the roadside edge node 12, such as the vehicles 24*a-b*. The RSE 48 includes a controller 74 and a SRWC circuit 76. The controller 74 includes a processor and memory, and may be used to process messages, such as BSMs, received from the vehicles 24*a-b*. These messages may be sent from the RSE 48 to the edge node management controller 28. The SRWC circuit 76 includes a chipset or other circuitry that enable use of one or more SRWC technologies, such as any of the IEEE 802.11 protocols (e.g., IEEE 802.11p, Wi-Fi™) WiMAX™, ZigBee™, Z-Wave™, Wi-Fi Direct™, Bluetooth™ (e.g., Bluetooth™ Low Energy (BLE)), or NFC. Although the RSE 48 is shown and described as being separate from the edge node management controller 28, in other embodiments, the RSE 48 and the edge node management controller 28 may be combined into a single device.

The traffic signal 50 is depicted as a stoplight or traffic light ("R" for red light, "Y" for yellow or amber light, and "G" for green light), but it should be appreciated that other traffic signaling devices can be used instead, such as any electronic signaling device that may be used to indicate information to a vehicular or pedestrian user of the roadway. Additionally, although there is only one traffic signal shown, it should be appreciated that numerous traffic signals may be used in system 10 and/or part of the roadside edge node 12, and that various different types of traffic signaling devices may be used. The traffic signal 50 may be connected to the edge node management controller 28, and the edge node management controller 28 may include suitable hardware components or interfaces so that it may connect to the traffic signal 50. In another embodiment, the traffic signal 50 is connected to another controller, such as the controller 74. This other controller may be connected to the edge node management controller 28 and may be used to provide a means of communication between the edge node management controller 28 and the traffic signal 50.

The third-party software packages 62-66 are each a collection of data that specifies computer instructions that are to be executed at one or more roadside edge nodes. The third-party software packages 62-66 may each be stored on the memory 56 of the edge node management controller 28 and may include one or more computer programs that are executable by the edge node management controller 28, such as by the software manager application 60. In one embodiment, the third-party software packages 62-66 is each containerized software that is packaged in a manner that is specified by the central management API so that the third-party software package may be installed and executed at the roadside edge node 12, such as by the edge node management controller 28. In one embodiment, these containerized third-party software packages are configured so that one or more programs of the third-party software package is readily executable by the edge node management controller 28 such that the third-party software package may be sent and installed at the edge node management controller 28 without having to carry out any custom configuration steps at the roadside edge node 12, which may include, for example, installing certain firmware on certain sensors.

Figure 3:
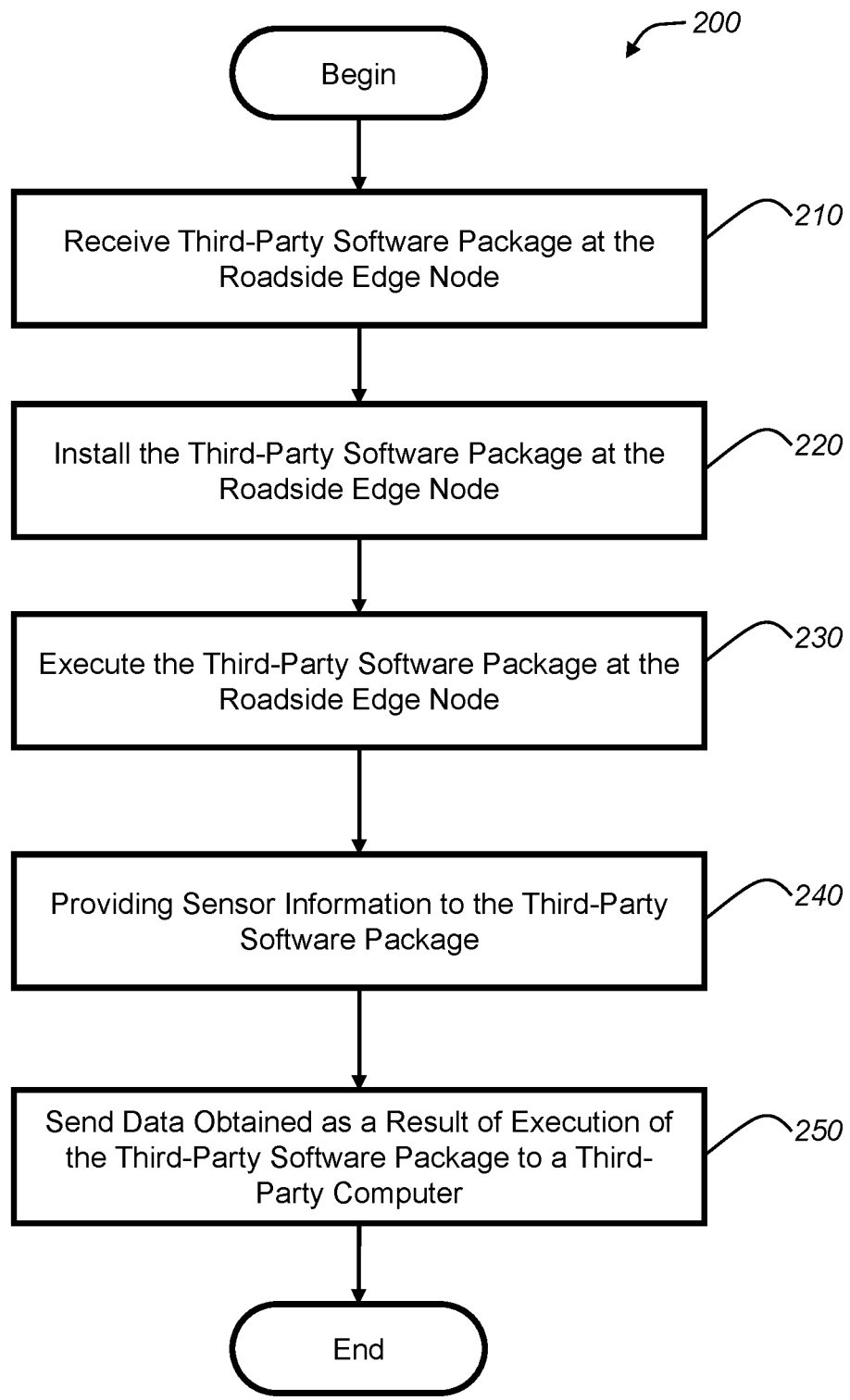
FIG. 3 is a flowchart of a method for managing third-party software packages at a roadside edge node, according to one embodiment.

With reference to FIG. 3, there is shown an embodiment of a method 200 of configuring a roadside edge node to execute a third-party software package. Although the present embodiment describes the method 200 as being carried out by the edge node management controller 28, it should be appreciated that, in other embodiments, one or more steps of the method 200 may be carried out by another component of the roadside edge node 12 or the system 10.

The method 200 begins with step 210, wherein a third-party software package is received at the roadside edge node. In at least one embodiment, the third-party software package is received at the edge node management controller 28 from one of the third-party remote computers 22, such as the first third-party remote computer 38. For example, the first third-party computer 38 sends a third-party software package to the edge node management controller 28 via the land network 14 and the third-party software package is then received at the network communications interface 52 of the edge node management controller 28. In one embodiment, the first third-party remote computer 38 sends the third-party software package to the edge node management controller 28 through use of the central management API, which may specify, for example, a particular request method (e.g., GET, POST), a network or resource path, and a format to use for the data being transferred. For example, the central management API may specify the content type (i.e., media or MIME type) that is to be used, and the first third-party remote computer 38 may then format the third-party software package according to the specified content type.

In one embodiment, the third-party software package is sent to the edge node management controller 28 via the municipal remote computer facility 18 and/or the central management remote facility 20. For example, in one scenario, a governing municipality may require that data that is to be sent to the roadside edge node 12 first be sent to the municipality, which will then send or deploy the data to the roadside edge node 12. In such a scenario, the municipal remote computer facility 18 may be configured to receive the third-party software package and then send the third-party software package to the roadside edge node 12, such as to the edge node management controller 28. The municipal remote computer facility 18 may perform certain processing on the one or more messages that contain the third-party software package, such as inspecting the one or more messages to determine the sender and/or to determine whether the third-party software package is allowed or permitted to be installed at the roadside edge node 12 or other specified roadside edge nodes.

In one embodiment, the third-party software package is sent to the edge node management controller 28 via the central management remote facility 20. In such an embodiment, for example, the first third-party remote computer 38 may send the third-party software package to the central management remote facility 20 according to the central management API. The central management remote facility 20 may then process the one or more messages containing the third-party software package for various purposes, such as, for example, to determine whether the third-party software package complies with the permissions granted to the third-party. Additionally or alternatively, permission checking may be performed by the edge node management controller 28 during execution of the third-party software package, as discussed below. In one embodiment, the central management remote facility 20 may then process the one or more messages containing the third-party software package to determine permissions for that third-party software package and may then send permissions data to the edge node management controller 28 specifying the permissions of the third-party software package. In one embodiment, the third-party software package is sent first to the central management remote facility 20, then to the municipal remote computer facility 18, and then to the roadside edge node 12. The method 200 continues to step 220.

In step 220, the third-party software package is installed at the roadside edge node. In at least one embodiment, the third-party software package is installed by the edge node management controller 28, such as by the software manager application 60. The third-party software package may be installed by the software manager application 60 through creating one or more directories, storing one or more files in certain directories (e.g., the created directories or other directories), and/or setting or registering certain environment variables. In general, the installation of the third-party software package is a process by which a component of the roadside edge node 12 (e.g., the edge node management controller 28) is configured so that the third-party software package is ready for execution, which, once the third-party software package is installed, may be initiated by running a certain script (or certain computer instructions) of the third-party software program. In one embodiment, the edge node management controller 28 installs the third-party software package on the edge node management controller 28. However, in other embodiments, the third-party software package may be installed at another controller located at the roadside edge node, such as the controller 74 of the RSE 28.

In one embodiment, the edge node management controller 28 may be configured to install the third-party software package in response to receiving the third-party software package from a remote computer, such as a computer of the municipal remote computer facility 18, a computer of the central management remote facility 20, or one of the third-party remote computers 22. In one embodiment, the central management API may be used to receive installation data that specifies one or more aspects of the installation of the third-party software package, such as values for certain environment variables and/or a directory structure that is to be used by the third-party software package. The software manager application 60 may reference this installation data when installing the third-party software application. In one embodiment, the installation data may be sent along with the third-party software package and may be configured or formatted in a manner specified by the central management API. For example, the central management API may specify that each third-party software package shall include an "installation.ini" file that specifies certain aspects of the installation, such as those mentioned above. In one embodiment, the installation data may specify an installation start script of the third-party software package that, when executed, causes the third-party software package to be installed to the roadside edge node 12. This installation start script may be configured according to the central management API and may be executed or initiated by the software manager application 60. According to some embodiments, the installation data may be received from a remote computer, such as a computer of the municipal remote computer facility 18, a computer of the central management remote facility 20, or one of the third-party remote computers 22. The method 200 continues to step 230.

In step 230, the third-party software package is executed at the roadside edge node. In at least some embodiments, the edge node management controller 28 manages execution of the third-party software package, which may include running or executing a start script. In general, execution of the third-party software package includes running or executing one or more sets of computer instructions (or computer programs) of the third-party software package, which may be embodied within one or more executable files, for example. In one embodiment, the software manager application 60 manages execution of the third-party software package, which may include selecting to run or execute a particular executable file of the third-party software package, receiving requests to access certain data of the roadside edge node (e.g., sensor data), and/or receiving requests to control one or more aspects of the roadside edge node (e.g., setting certain sensor parameter, such as a sampling rate). The amount of access and control given to the third-party software package may be determined or set based on various factors. For example, different third-party software packages may be given different amounts of data access and/or different amount of sensor or actuator access. This may include a minimal access level that only allows the software package to receive a standardized or other feed of sensor data, a first intermediate access level in which the software package can request specific sensor data and/or externally sourced data received at the roadside edge node, a second intermediate access level in which the software package can at least partially control one or more sensors by specifying sensor parameters (sampling rate, field of view, PTZ camera settings, etc.), as well as a maximal access level that permits the software package to control not just sensors, but actuators such as traffic signals and pedestrian signage. Other such various access levels may be available for the third-party software packages. The method 200 continues to step 240.

In step 240, sensor information is provided to the third-party software package, wherein the sensor information indicates information concerning one or more sensors that are present at the roadside edge node. The sensor information may specify the type of sensor (e.g., lidar, camera), one or more operation attributes of the sensor (e.g., a current resolution of the sensor, one or more supported resolutions, a sampling or frame rate of the sensor), and an output file type, format, or encoding that is used for the sensor data. Other types of information relating to the sensor may be included as a part of the sensor information as well. The sensor information may be organized into a standard format and sent to the third-party software package, and this standard format may be defined by the central management API. In one embodiment, the sensor information may be automatically sent to the third-party software package, such as upon initialization of the third-party sensor package, or may be sent in response to a request from the third-party sensor package. Such a request from the third-party sensor package may also be sent according to the central management API. The method 200 continues to step 250.

In step 250, data obtained as a result of execution of the third-party software package is sent to a third-party remote computer. As a part of executing the third-party software package, certain data, such as certain sensor data or vehicle-to-infrastructure (V2I) data, may be obtained. For example, the third-party software package, when executed, may process sensor data received from the lidar sensor 44 and then store certain lidar sensor data in the memory 56 of the edge node management controller 28. As another example, V2I data, which is data received at the roadside edge node 12 from one or more vehicles (e.g., the first vehicle 24*a*), may be processed and certain V2I data may be stored in the memory 56 of the edge node management controller 28. This stored data may then be sent to one of the third-party remote computers 22, such as the first third-party remote computer 38. In one embodiment, the central management API is used to specify the manner or form in which data may be sent from the edge node management controller 28 to one or more remote computers, such as the first third-party remote computer 38. The method 200 then ends.

In one embodiment, the method 200 is used to install an update to a third-party software package instead of installing a new third-party software package. This update (referred to as a "third-party software package update") may be sent from a third-party remote computer to the edge node management controller 28 in the same manner as described above with respect to sending the third-party software package as a part of step 210. Installing the update may include changing one or more files of the third-party software package as it exists at the edge node management controller 28.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method for managing third-party software packages at a roadside edge node, comprising the steps of:
   receiving a third-party software package at an edge node management controller that is located at a roadside edge node, wherein the edge node management controller is used to execute a software manager application;
   using the software manager application, installing the third-party software package at the roadside edge node, wherein the software manager application is configured to receive sensor data requests from the third-party software package and one or more other third-party software packages installed at the roadside edge node, and wherein each sensor data request of the sensor data requests is formed according to an application programming interface (API);
   executing the third-party software package at the roadside edge node; and
   providing sensor information to the third-party software package indicating information concerning one or more sensors that are present at the roadside edge node.

2. The method of claim 1, wherein the third-party software package is installed on the edge node management controller and executed on the edge node management controller.

3. The method of claim 1, wherein the API is used by the third-party software package to communicate with the software manager application.

4. The method of claim 3, wherein the sensor information is provided to the third-party software package as a sensor data response to the sensor data request from the third-party software package, and wherein the sensor data request and the sensor data response are configured according to the API.

5. The method of claim 1, wherein the third-party software package is received from a third-party remote computer that is located remotely from the roadside edge node.

6. The method of claim 5, wherein the third-party software package is containerized according to specifications set forth by the API.

7. The method of claim 6, wherein the software manager application is configured in a manner that enables any third-party sensor package that is containerized according to the API to be installed at the roadside edge node.

8. The method of claim 1, wherein the executing step further comprises the third-party software package controlling the one or more sensors.

9. The method of claim 1, wherein the method is carried out at the roadside edge node.

10. The method of claim 1, wherein the method is carried out by the edge node management controller.

11. The method of claim 1, wherein the roadside central management system is located at a single roadside edge location whereat the third-party software package and the one or more other third-party software packages are executed so as to generate the sensor data requests.

12. The method of claim 1, wherein the roadside central management system is located at a single roadside edge location whereat the third-party software package and the one or more other third-party software packages receive the sensor information in response to the sensor data requests.

13. A roadside central management system, comprising:
   an edge node management controller having at least one processor and a non-transitory, computer-readable memory storing computer instructions constituting a software manager application; and
   a network communications interface that includes hardware enabling data communications and that is communicatively coupled to the controller;
   wherein the computer instructions, when executed by the at least one processor, cause the roadside central management system to:
   receive a third-party software package at the edge node management controller that is located at a roadside edge node, wherein the edge node management controller is used to execute the software manager application, wherein the software manager application is configured to receive sensor data requests from the third-party software package and one or more other third-party software packages installed at the roadside edge node, and wherein each sensor data request of the sensor data requests is formed according to an application programming interface (API);
   using the software manager application, install the third-party software package at the roadside edge node;
   execute the third-party software package at the roadside edge node; and
   provide sensor information to the third-party software package indicating information concerning one or more sensors that are present at the roadside edge node.

14. The roadside central management system of claim 13, wherein the roadside central management system is installed at the roadside edge node.

15. The roadside central management system of claim 14, wherein the one or more sensors are connected to the controller, and wherein the controller is configured to implement the API that is used by the third-party software package to communicate with the software manager application.

16. The roadside central management system of claim 15, wherein the sensor information is provided to the third-party software package as a response to the sensor data request from the third-party software package, and wherein the sensor data request and the response are configured according to the API.

17. The roadside central management system of claim 13, wherein the roadside central management system is located at a single roadside edge location whereat the third-party software package and the one or more other third-party software packages are executed so as to generate the sensor data requests.

18. The roadside central management system of claim 13, wherein the roadside central management system is located at a single roadside edge location whereat the third-party software package and the one or more other third-party software packages receive the sensor information in response to the sensor data requests.

\* \* \* \* \*